(12) United States Patent
Greif et al.

(10) Patent No.: US 10,124,414 B2
(45) Date of Patent: Nov. 13, 2018

(54) CLAMPING ASSEMBLY AND CLAMPING DEVICE WITH SUCH A CLAMPING ASSEMBLY

(71) Applicant: OTT-JAKOB SPANNTECHNIK GMBH, Lengenewang (DE)

(72) Inventors: Josef Greif, Friesenried (DE); Conrad Rösch, Steinrumpelweg 20 (DE); Bartholomäus Reisacher, Jr., Buchloe (DE)

(73) Assignee: OTT-JAKOB SPANNTECHNIK GMBH, Lengenewang (DE)

(*) Notice: Subject to any disclaimer, the term of this patent is extended or adjusted under 35 U.S.C. 154(b) by 83 days.

(21) Appl. No.: 15/370,304

(22) Filed: Dec. 6, 2016

(65) Prior Publication Data
US 2017/0157679 A1 Jun. 8, 2017

(30) Foreign Application Priority Data
Dec. 7, 2015 (DE) .................. 10 2015 121 236

(51) Int. Cl.
*B23B 31/40* (2006.01)
*B23B 31/26* (2006.01)
*B23B 31/30* (2006.01)

(52) U.S. Cl.
CPC ........ *B23B 31/4053* (2013.01); *B23B 31/261* (2013.01); *B23B 31/30* (2013.01); *B23B 2260/034* (2013.01); *B23B 2270/08* (2013.01)

(58) Field of Classification Search
CPC ............ B23B 29/034; B23B 29/03457; B23B 29/03478; B23B 29/03446; B23B 29/0345; B23B 29/03482; B23B 29/03492; B23B 29/0346; B23Q 11/10; B23Q 11/1015; B23Q 11/1023; B23Q 11/103; Y10T 408/44; Y10T 408/45; Y10T 408/455; Y10T 408/858; Y10T 408/8588; Y10T 408/8584; Y10T 408/85892; Y10T 82/125; Y10T 82/128
See application file for complete search history.

(56) References Cited

U.S. PATENT DOCUMENTS

| | | | | |
|---|---|---|---|---|
| 5,421,681 A * | 6/1995 | Stephens | ........... | B23B 29/03457 408/168 |
| 6,050,756 A * | 4/2000 | Buchholz | ................ | B24B 41/04 137/896 |
| 6,582,167 B1 * | 6/2003 | Sugata | .................. | B23B 31/261 408/59 |

(Continued)

FOREIGN PATENT DOCUMENTS

DE 10159611 C1 5/2003

*Primary Examiner* — Sunil K Singh
*Assistant Examiner* — Nicole N Ramos
(74) *Attorney, Agent, or Firm* — Paul D. Bianco; Fleit Gibbons Gutman Bongini & Bianco, PL (57) ABSTRACT

A clamping assembly for a clamping device for clamping of a workpiece or tool or a toolholder on machine component with a clamping cone movable axially via a tension rod and several clamping elements arranged spaced from each other in the peripheral direction on the outside of the clamping cone, which can be moved between a radially outer clamped position and a radially inner released position by axial movement of the tension rod. The clamping cone includes two parts movable opposite each other in the axial direction.

12 Claims, 5 Drawing Sheets

(56) References Cited

U.S. PATENT DOCUMENTS

| | | | | |
|---|---|---|---|---|
| 6,674,189 B2 * | 1/2004 | Watanabe | .......... | B23Q 11/0883 |
| | | | | 310/52 |
| 6,923,605 B2 | 8/2005 | Jakob et al. | | |
| 7,195,431 B2 * | 3/2007 | Greif | .................... | B23B 31/261 |
| | | | | 279/900 |
| 7,393,311 B1 * | 7/2008 | Giovanelli | ........... | B23Q 17/003 |
| | | | | 409/131 |
| 2005/0095075 A1 * | 5/2005 | Schweizer | ........... | B23Q 1/0018 |
| | | | | 409/136 |
| 2005/0232720 A1 * | 10/2005 | Lu | ......................... | B23B 31/265 |
| | | | | 409/233 |
| 2006/0034670 A1 * | 2/2006 | Sugita | .................. | B23B 31/265 |
| | | | | 409/231 |
| 2009/0162157 A1 * | 6/2009 | Makino | .................. | B23B 31/02 |
| | | | | 408/56 |

* cited by examiner

CLAMPING ASSEMBLY AND CLAMPING DEVICE WITH SUCH A CLAMPING ASSEMBLY

FIELD OF THE DISCLOSURE

The disclosure relates to a clamping assembly for clamping a workpiece or tool or toolholder on a machine component of a machine tool. The disclosure also relates to a clamping device with such a clamping assembly.

BACKGROUND

A clamping assembly with a clamping cone axially movable via a tension rod and several claw-like clamping elements spaced from each other on its outside in the peripheral direction is known from DE 101 59 611 C1. The claw-like clamping elements have oblique first clamping surfaces on their front end to contact corresponding oblique clamping slopes of the hollow shank tool, and second oblique clamping surfaces on their rear end for contact on a corresponding mating surface of the machine spindle. The clamping cone, designed as a single piece, has first conical clamping surface areas on its front end and second conical clamping surface areas on its rear end for contact on corresponding inside surfaces on the front and rear ends of the claw-like clamping elements. By axial displacement of the clamping cone arranged on the end of a tension rod, the claw-like clamping elements are pushed radially outward or inward in a position parallel to the center axis of the machine spindle so that the hollow shank tool can be clamped or released.

SUMMARY

A clamping assembly and a clamping device with such a clamping assembly that permit a more effective clamping process is disclosed.

Advanced embodiments and advantageous modifications are also disclosed.

In an embodiment, the clamping cone in the clamping assembly according to the disclosure has two parts that move opposite each other in the axial direction. In comparison with a one-part clamping cone the activating force is not supported on the housing but guided to the other part of the clamping cone. Improved efficiency is thereby obtained and the clamping process can be configured more effectively.

In a particularly advanced embodiment, the clamping elements can be moved into the radially outer clamping position by moving two parts of the clamping cone together and into the radially inner release position by moving the two parts of the clamping cone apart. With oppositely sloped clamping slopes, however, the clamping elements in an alternative embodiment can also be moved into the clamping position by moving the two parts of the clamping cone apart and into the release position by moving the two parts of the clamping cone together.

Opposite displacement of the two separate parts of the clamping cone can be achieved in an expedient manner by a tension rod, which has a first rod part connected to the first part of the clamping cone and a second rod part connected to the second part of the clamping cone. The first rod part can preferably be arranged axially movable within the tubular second rod part.

In another advantageous modification, the clamping element has a first inner clamping surface for contact on a conical outer surface of the first part of the clamping cone and a second inner clamping surface for contact on a conical outer surface of the second part of the clamping cone.

Appropriate and precise guiding of the two parts of the clamping cone movable relative to each other can be achieved due to the fact that the first part of the clamping cone contains a cylindrical guide area on which a hollow cylindrical guide section of the second part of the clamping cone is guided to move.

The clamping elements can be designed, for example, in the form of clamping claws with a first outer clamping surface formed by a conical surface section and a second outer clamping surface also formed by a conical flat section sloped opposite to the first clamping surface. The clamping elements, however, can also have a different shape.

The disclosure also concerns a clamping device with a clamping assembly just described arranged within a machine component and an activation device connected to the clamping assembly.

The activation device can contain a cylinder arranged within a housing, in which a first piston connected to the first part of the clamping cone via a first piston rod and a second piston connected to the second part of the clamping cone via a second piston rod are arranged to move axially. A first pressure chamber can be situated between the two pistons, which is connected via a first channel in a sleeve enclosing the cylinder with a first connection. A second pressure chamber can be delimited between the first piston and a front surface of a rear end part screwed into the housing on the rear end of the cylinder and a third pressure chamber delimited between the second piston and a closure ring on the front end of the cylinder, in which case the second pressure chamber and the third pressure chamber are connected with a second connection.

Activation of the clamping assembly can also occur differently. For example, the two parts of the clamping cone can be forced apart via a spring arrangement tightened between the two rod parts of the tension rod, so that the clamping elements are thereby held in a clamped position. In order to move the clamping elements into the released position, both parts of the clamping cone can be moved together via an electrically, pneumatically or hydraulically operated loosening device against the force of the spring arrangement.

The machine component can be the working spindle of a machine tool mounted to rotate and be rotatable by a drive.

BRIEF DESCRIPTION OF THE DRAWINGS

Additional details and advantages of the disclosure are apparent from the following description of a preferred embodiment example with reference to the drawings. In the drawings.

DETAILED DESCRIPTION

Figure 1:
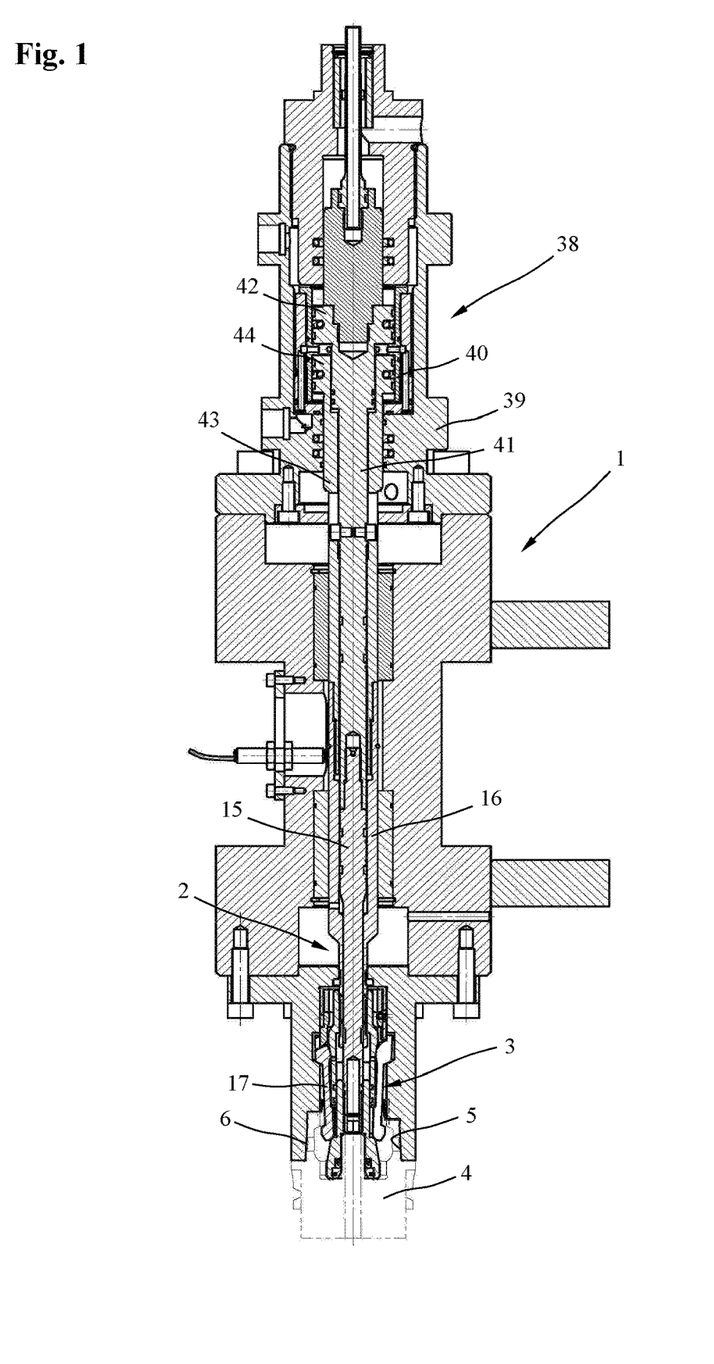
FIG. 1 shows a clamping device with a tension rod and a clamping assembly in longitudinal section.

An integrated clamping device in a machine component 1 is shown in a longitudinal section in FIG. 1 with a tension rod 2 axially movable within the machine component 1 and a clamping assembly 3 movable by the tension rod 2 between a clamped position and a released position for clamping or release of a toolholder 4 (indicated by a dashed line) or a tool or workpiece. The machine component 1 in the depicted embodiment is stationary machine element composed of several parts, which contains a conical receiving opening 5 to receive a hollow cone shank 6 of the toolholder 4. The machine component 1, however, can also be a working spindle of a machine tool or the like mounted to rotate within a spindle housing and driven to rotate by a drive.

Figure 2:
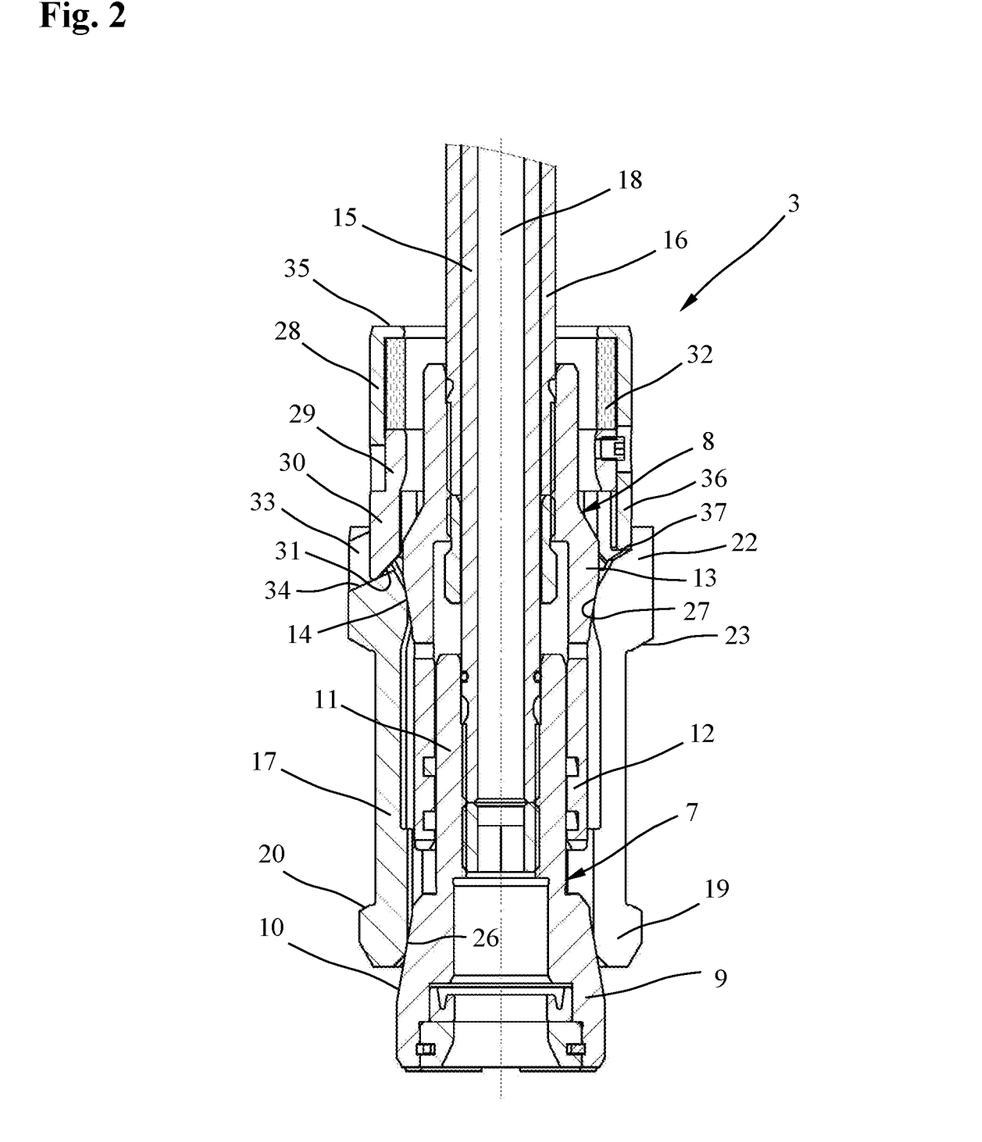
FIG. 2 shows a detailed view of the clamping assembly depicted in FIG. 1 in longitudinal section.

The clamping assembly 3 depicted separately in FIG. 2 contains a clamping cone, which consists of two separate parts 7 and 8 movable relative to each other in the axial direction. The first part 7 of the clamping cone arranged on the bottom in FIG. 2 and facing the toolholder 4 has a conical clamping area 9 with a conical outer surface 10 and a cylindrical guide area 11. The second part 8 of the clamping cone contains a hollow cylindrical guide section 12 guided to move on the guide area 11 of the first part 7 and a conical clamping area 13 with a conical outer surface 14. The conical outer surfaces 10 and 14 of the clamping areas 9 and 13 are sloped opposite each other on the two parts 7 and 8. The two parts 7 and 8 of the clamping cone are guided to move axially relative to each other through the guide area 11 and the guide section 12.

The tension rod 2 contains an axially movable first rod part 15 and a second rod part 16 axially movable relative to the first rod part 1. On the front end of the first rod part 15, designed tubular here, the first part 7 of the clamping cone 15 is fastened, whereas the second part 8 of the clamping cone is fastened on the end of the second tubular rod part 16 arranged around the first rod part 15 and coaxial thereto. The two parts 7 and 8 of the clamping cone can be moved together or moved apart via the two rod parts 15 and 16.

Several clamping elements 17 equally spaced from each other in the peripheral direction lie on the conical outer surface 10 of the first part 7 and the conical outer surface 14 of the second part 8 of the clamping cone, which are arranged parallel to a center axis 18 of the clamping assembly 3 in a clamped position depicted in FIG. 2. The clamping elements 17, designed here as clamping claws, contain a thickened front end 19 facing the toolholder 4 with a first outer clamping surface 20, which in a clamped position depicted in FIG. 3 comes in contact in known fashion on a conical inside surface 21 on the inside of the hollow cone shank 6 of toolholder 4 depicted in FIG. 1. The claw-like clamping elements 17 also contain a thickened rear end 22 with a second outer clamping surface 23 sloped oppositely to the first clamping surface 20 and also formed by a conical flat section, with which the clamping elements 17 according to FIG. 3 are supported on a conical mating surface 24 within an annular shoulder 25 in machine component 1.

The claw-like clamping elements 17 can be moved into the radially outer clamped position by moving the two parts 7 and 8 of the clamping cone together, and they can be moved into the radially inner released position by moving the two parts 7 and 8 of the clamping cone apart.

Figure 3:
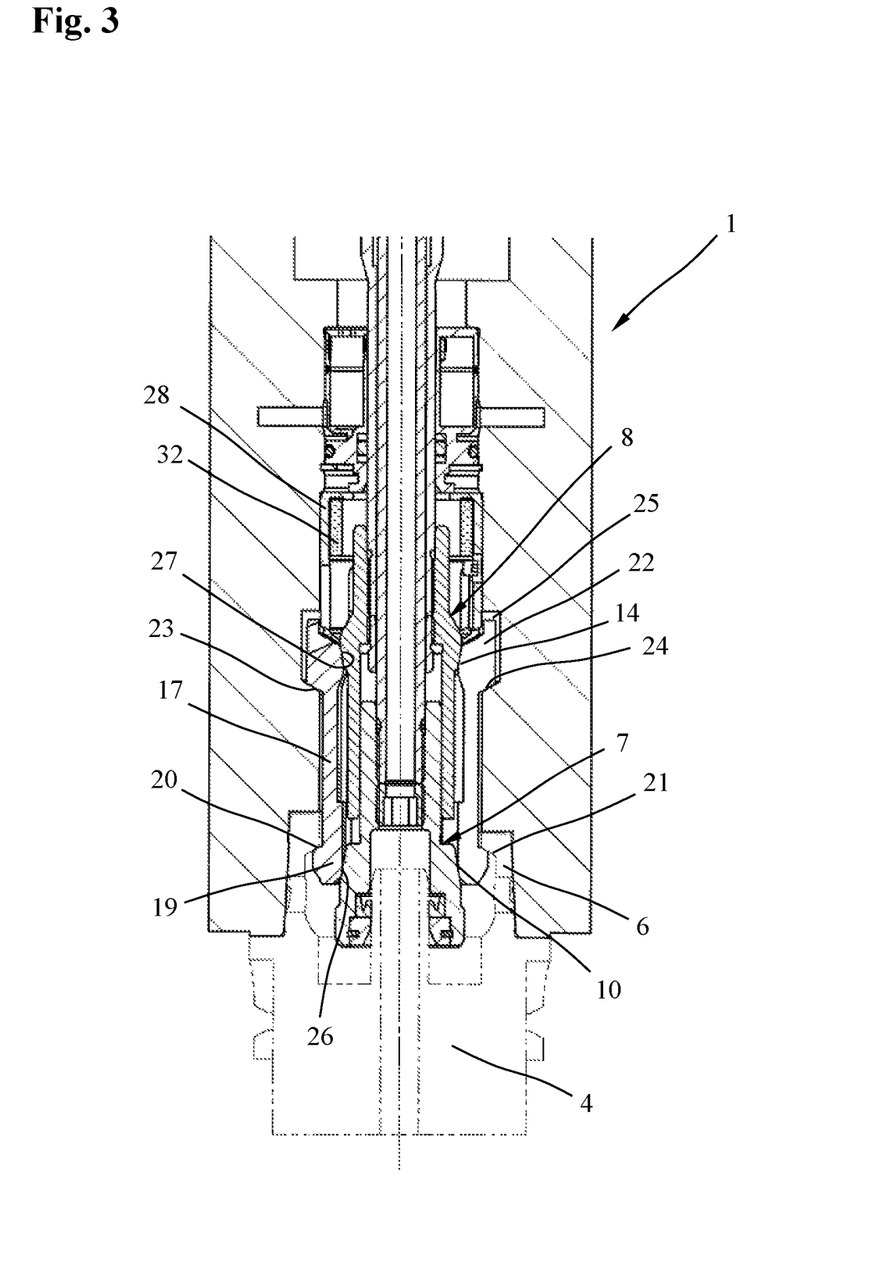
FIG. 3 shows the clamping assembly in a clamped position.

In the clamped position of FIG. 3, the claw-like clamping elements 17 lie against the conical outer surface 10 of the first part 7 with a first inner clamping surface 26 provided on the inside of the front end 19 and against the conical outer surface 14 of the second part 8 with a second inner clamping surface 27 provided on the inside of the rear end 22.

Figure 4:
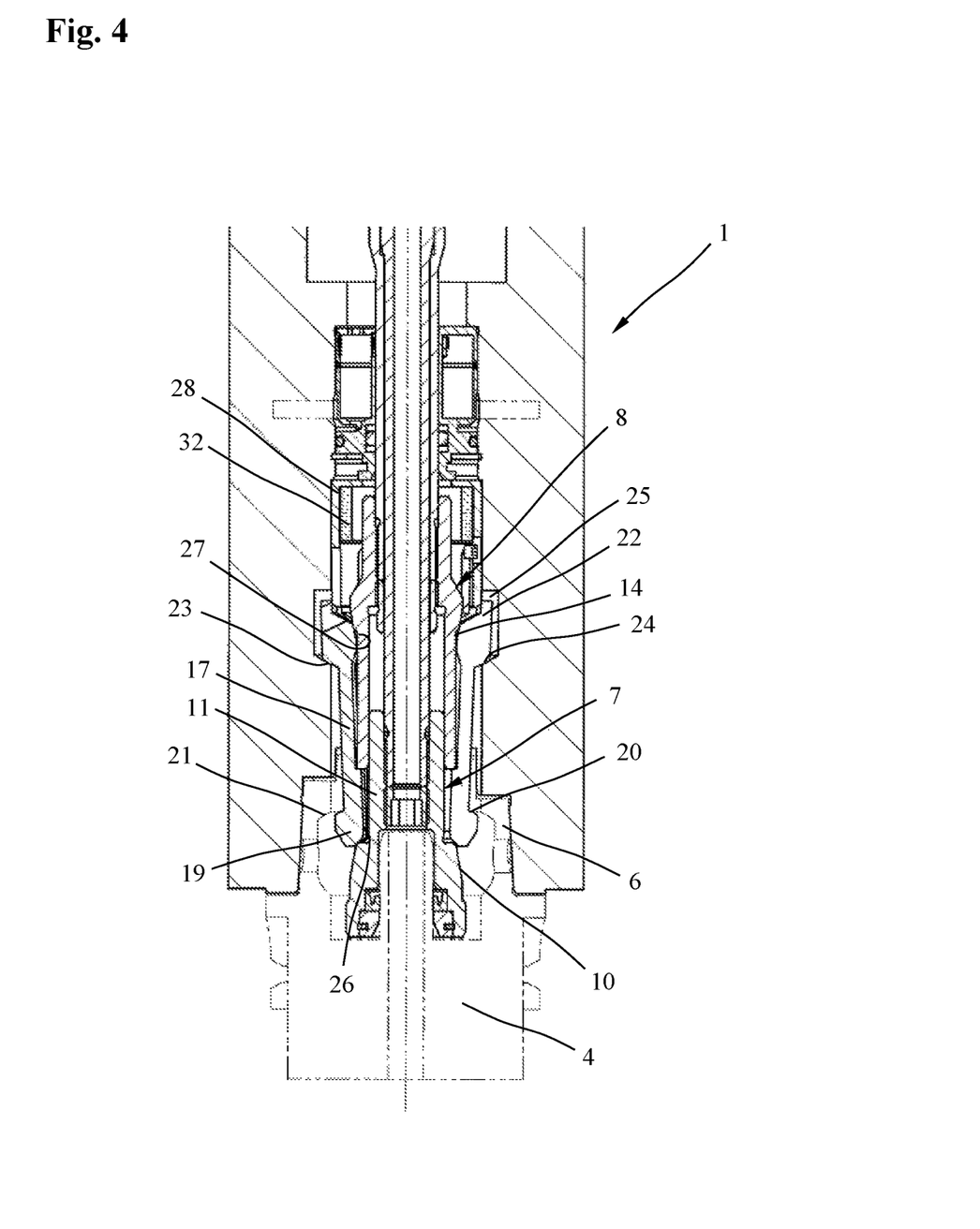
FIG. 4 shows the clamping assembly in a released position.

In the released position of FIG. 4, the front ends 19 of the claw-like clamping element 17 engaging in the toolholder 4 lie with their first inner clamping surface 26 on slopes on the narrower rear end of the conical clamping area 9 on the first part 7 of the clamping cone, so that the front ends 19 are moved radially inward and release the toolholder 4 for an exchange. The conical outer surfaces 10 and 14 on the two parts 7 and 8 of the clamping cone and the inner clamping surfaces 26 and 27 of the clamping claws 17 [sic; elsewhere clamping elements 17] are adjusted to each other so that the clamping claws 17 are moved radially outward when the two parts 7 and 8 are pushed together and radially inward when the two parts 7 and 8 are pushed apart.

A spacer (further shown in FIG. 2) is arranged on the rear end 22 of the claw-like clamping elements 17 lying against the second part 8 of the clamping cone, through which the clamping elements 17 are held separated from each other with a predetermined spacing in the peripheral direction. The spacer contains a holding sleeve 29 guided to move axially within a guide sleeve 28, which has several shoulders 30 with beveled front faces 31 protruding in the axial direction and equally spaced in a peripheral direction on the end facing the clamping element 17. The holding sleeve 29 is movable within the guide sleeve 28 and is forced by a compression spring 32 in the direction of the claw-like clamping element 17. The shoulders 30 of the holding sleeve 29 engage in a groove 33 on the rear second end 22 of the claw-like clamping element 17 and lie with their beveled face 31 against an oblique mating surface 34 in the base of groove 33.

The guide sleeve 28 has a rear contact surface 35 and on the front end has several annular segments 36 with beveled front ends 37 spaced from each other in the peripheral direction and extending between the shoulders 30 of holding sleeve 29 for contact against the rear second ends 22 of the claw-like clamping element 17.

Figure 5:
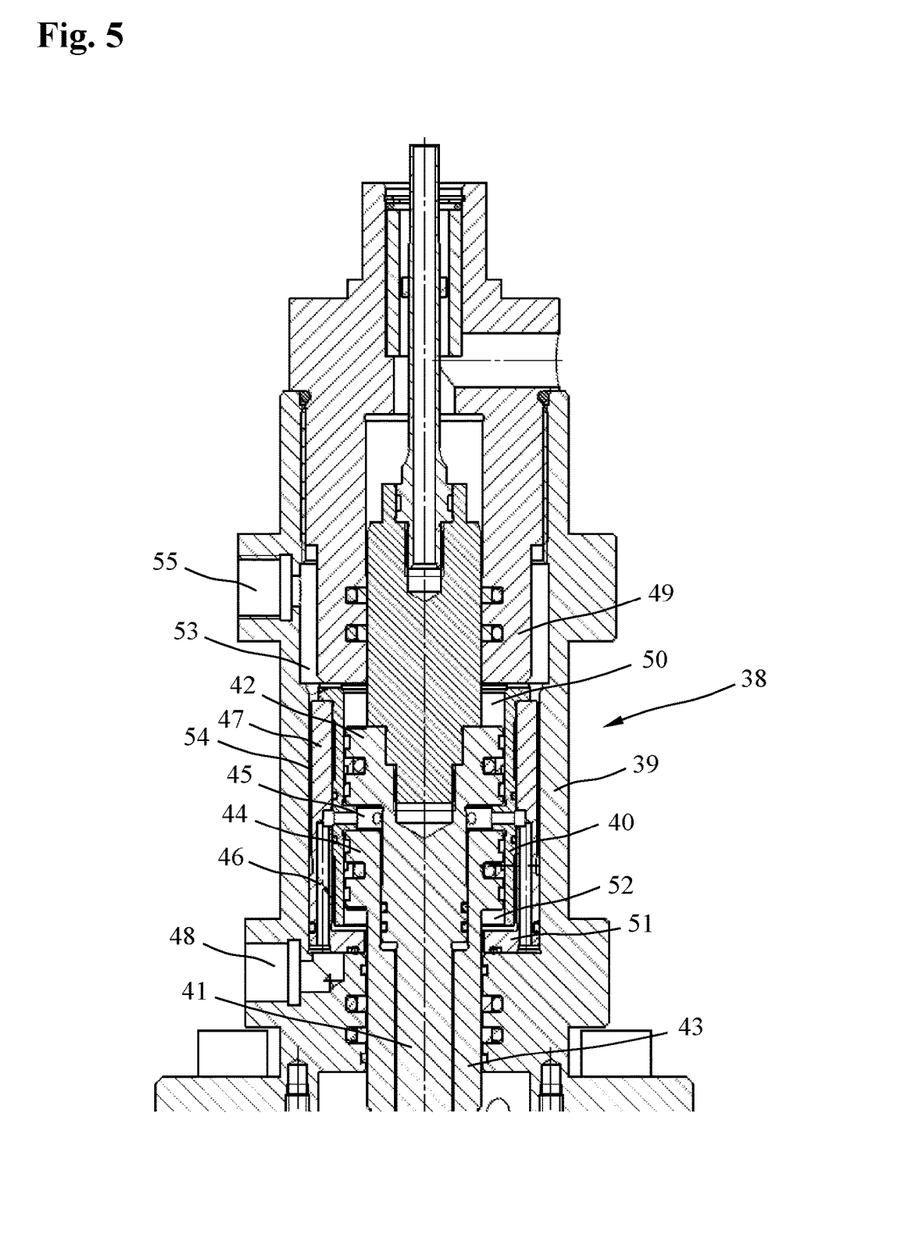
FIG. 5 shows an activation device to move the clamping assembly between the clamped position and the released position.

An activation device 38 depicted separately in FIG. 5 is arranged on the rear end of machine component 1 facing away from toolholder 4, through which the two rod parts 15 and 16 of the tension rod 2 can be moved opposite each other. The activation device 38 contains a cylinder 40 arranged within a housing 39, in which a first piston 42 connected to the first part 7 of the clamping cone via a first piston rod 41 and the first rod part 15 of the tension rod 2 and a second piston 44 connected to the second part 8 of the clamping cone via a second piston rod 43 and the second rod part 16 of the tension rod 2 can be moved axially and are sealed radially. The second piston 44 is designed as an annular piston in which the piston rod 41 of the first piston 42 is guided to move.

As follows from FIG. 5, a first pressure chamber 45 is situated between the two pistons 42 and 44, which is connected with a first connection 48 via first channel 46 in a sleeve 47 in closing cylinder 40. A second pressure chamber 50 is delimited between the first piston 42 and a face of a rear end part 49 screwed into housing 39 on the rear end of cylinder 40 and a third pressure chamber 52 is delimited between the second piston 44 and a closure ring 51 on the front end of cylinder 40. The second pressure chamber 50 and a third pressure chamber 52 are connected with a second connection 55 via a second channel 53 running between the end part 49 and housing 39 and a third channel 54 running between cylinder 40 and sleeve 47.

The clamping device just described functions as follows:
When the first connection 48 of the activation device 38 is acted upon with hydraulic fluid, the two pistons 42 and 44 move apart, so that the two parts 7 and 8 of the clamping cone are moved toward each other via the piston rods 41 and 43 and the two rod parts 15 and 16 of tension rod 2 and the clamping element 17 enter the clamped position depicted in FIG. 3. The outer clamping surfaces 20 and 23 of the clamping elements 17 in this clamped position lie against the conical inside surface 21 of the toolholder 4 and the conical mating surface 24 in the machine component 1, so that the toolholder 4 is held under tension in the receiving opening 5 of machine component 1.

To release the clamping device, the second connection 55 is acted upon with a hydraulic fluid so that the two pistons 42 and 44 are moved toward each other. The two parts 7 and 8 of the clamping cone are thereby moved apart so that the clamping elements 17 reach the released position depicted in FIG. 4. In this position, the clamping elements 17 lying against the outside of the two parts 7 and 8 of the clamping cone are pushed radially inward so far that their clamping surfaces 20 disengage from the conical inside surface 21 on the inside of the toolholder 4 and the toolholder 4 can be easily removed from the conical receiving opening 5.

The clamping assembly according to the disclosure is not restricted to the embodiment example described above. For example, the clamping elements can have the form of a sphere or another appropriate shape. The clamping system according to the disclosure can be used not only in hollow cone clamping systems, but also in steeply tapered clamping systems or other clamping systems. The clamping assembly can be designed for holding tools with a hollow shank cone (HSC) and for holding tools with a steep cone (SC) in the fashion of a collet, as a clamping assembly for polygonal shank clamping systems (PSC), as a clamping assembly with spherical clamping elements or as a clamping assembly for other tool exchange systems. The clamping device is also suitable for releasable holding of workpieces. Different activation devices can also be used to bring together or separate the two parts of the clamping cone.

LIST OF REFERENCE NUMBERS

1 Machine component
2 Tension rod
3 Clamping assembly
4 Toolholder
5 Conical receiving opening
6 Hollow cone shank
7 First part of the clamping cone
8 Second part of the clamping cone
9 Conical clamping area
10 Conical outer surface
11 Cylindrical guide area
12 Guide section
13 Conical clamping area
14 Conical outer surface
15 First rod part
16 Second rod part
17 Claw-like clamping element
18 Center axis
19 First end of the clamping element
20 First outer clamping surface
21 Conical inner surface
22 Second end of the clamping element
23 Second outer clamping surface
24 Conical mating surface
25 Annular shoulder
26 First inner clamping surface
27 Second inner clamping surface
28 Guide sleeve
29 Holding sleeve
30 Shoulders
31 Face
32 Compression spring
33 Groove
34 Mating surface
35 Rear contact surface
36 Annular segments
37 Beveled front end
38 Activation device
39 Housing
40 Cylinder
41 First piston rod
42 First piston
43 Second piston rod
44 Second piston
45 First pressure chamber
46 First channel
47 Sleeve
48 First connection
49 End part
50 Second pressure chamber
51 Closure ring
52 Third pressure chamber
53 Second channel
54 Third channel
55 Second connection

What is claimed is:

1. A clamping assembly for a clamping device for clamping of a workpiece or tool or a toolholder on machine part, the clamping assembly comprising a clamping cone movable axially via a tension rod and a plurality of clamping elements arranged spaced from each other in a peripheral direction on an outside of the clamping cone, which are movable between a radially outer clamped position and a radially inner released position by axial movement of the tension rod, wherein the clamping cone has first and second parts movable opposite each other in an axial direction and wherein the clamping elements have a first inner clamping surface for contact on a conical outer surface of the first part of the clamping cone and a second inner clamping surface for contact on a conical outer surface of the second part of the clamping cone.

2. The clamping assembly according to claim 1, wherein the clamping elements are movable into the radially outer clamped position by moving the first and second parts of the clamping cone together and into the radially inner released position by moving the first and second parts of the clamping cone apart.

3. The clamping assembly according to claim 1, wherein the tension rod has a first rod part connected to the first part of the clamping cone and a second rod part connected to the second part of the clamping cone.

4. The clamping assembly according to claim 3, wherein the first rod part is arranged to move axially within the second rod part.

5. The clamping assembly according to claim 1, wherein the first part of the clamping cone contains a cylindrical guide area, on which a hollow cylindrical guide section of the second part of the clamping cone is guided to move.

6. The clamping assembly according to claim 1, wherein the clamping elements are designed in the form of clamping claws with a first outer clamping surface formed by a conical flat section and a second outer clamping surface sloped opposite the first clamping surface and formed by a conical flat section.

7. A clamping device for clamping of a workpiece or tool or toolholder on a machine part with the clamping assembly of claim 1 arranged within the machine part and an activation device connected to the clamping assembly.

8. A clamping device for clamping of a workpiece or tool or toolholder on a machine part with a clamping assembly arranged within the machine part and an activation device connected to the clamping assembly, wherein the clamping assembly comprises a clamping cone movable axially via a tension rod and a plurality of clamping elements arranged spaced from each other in a peripheral direction on an outside of the clamping cone, which are movable between a radially outer clamped position and a radially inner released position by axial movement of the tension rod, the clamping cone having first and second parts movable opposite each other in an axial direction, and wherein the activation device contains a cylinder arranged within a housing, in which a first piston connected to the first part of the clamping cone via a first piston rod and a second piston connected to second part of the clamping cone via a second piston rod are arranged to move axially.

9. The clamping device according to claim 8, wherein a first pressure chamber is situated between the two pistons, which is connected with a first connection via a first channel in a sleeve enclosing the cylinder.

10. The clamping device according to claim 9, wherein a second pressure chamber is delimited between the first piston and a face of a rear end part screwed into the housing on the rear end of the cylinder and a third pressure chamber is delimited between the second piston and a closure ring on the front end of the cylinder, the second pressure chamber and the third pressure chamber connected with a second connection.

11. The clamping device according to claim 7, wherein the activation device contains a clamping spring to hold the clamping elements in the clamped position and a release unit to move the clamping elements into the released position against the force of the clamping spring.

12. The clamping device according to claim 7, wherein the machine part is a work spindle of a machine tool mounted to rotate and be rotatable by a drive.

* * * * *